United States Patent [19]

Revell

[11] 4,441,898

[45] Apr. 10, 1984

[54] DISCHARGE APPARATUS FOR REMOVING GRANULAR FILTER MATERIAL FROM A FILTER HOUSING AND A FILTER APPARATUS HAVING SAME

[75] Inventor: Alan E. Revell, Louisville, Ky.

[73] Assignee: American Air Filter Company, Inc., Louisville, Ky.

[21] Appl. No.: 250,492

[22] Filed: Apr. 2, 1981

Related U.S. Application Data

[63] Continuation of Ser. No. 808,915, Jun. 22, 1977, abandoned.

[51] Int. Cl.$^3$ ..................... B01D 46/34; B01D 50/00
[52] U.S. Cl. ............................ 55/350; 55/390; 55/474; 55/479
[58] Field of Search ............... 55/474, 479, 431, 390, 55/99, 484, 518, 512, 350

[56] References Cited

U.S. PATENT DOCUMENTS

| | | | |
|---|---|---|---|
| 2,796,237 | 6/1957 | Nettel | 55/474 X |
| 2,911,036 | 11/1959 | Lazar et al. | 55/431 X |
| 3,212,240 | 10/1965 | Streete | 55/431 X |
| 3,716,969 | 2/1973 | Maeda | 55/479 X |
| 3,815,335 | 6/1974 | Barnebey | 55/474 X |
| 3,925,046 | 12/1975 | Hickey et al. | 55/512 X |
| 3,964,890 | 6/1976 | Bonn | 55/479 |

Primary Examiner—Kathleen J. Prunner
Attorney, Agent, or Firm—Thomas G. Anderson

[57] ABSTRACT

A filter apparatus including a housing having a discharge apparatus for removing granular gas treating material from the hopper of the housing. The discharge apparatus includes a baffle plate extending across the hopper between the side walls of the housing which defines a material discharge channel opening into the interior of the hopper through a pair of parallel slots extending along the edges of the baffle plate, a conveying gas inlet aperture in one of the side walls opening into one end of the conveying channel, and a gas treating and conveying gas outlet aperture in the other side wall opening into the other end of the conveying channel of a larger cross-sectional area than the conveying gas inlet aperture to promote progressive aspiration of the treating material from the interior of the hopper commencing at the end of the channel proximate the conveying gas inlet aperture.

9 Claims, 12 Drawing Figures

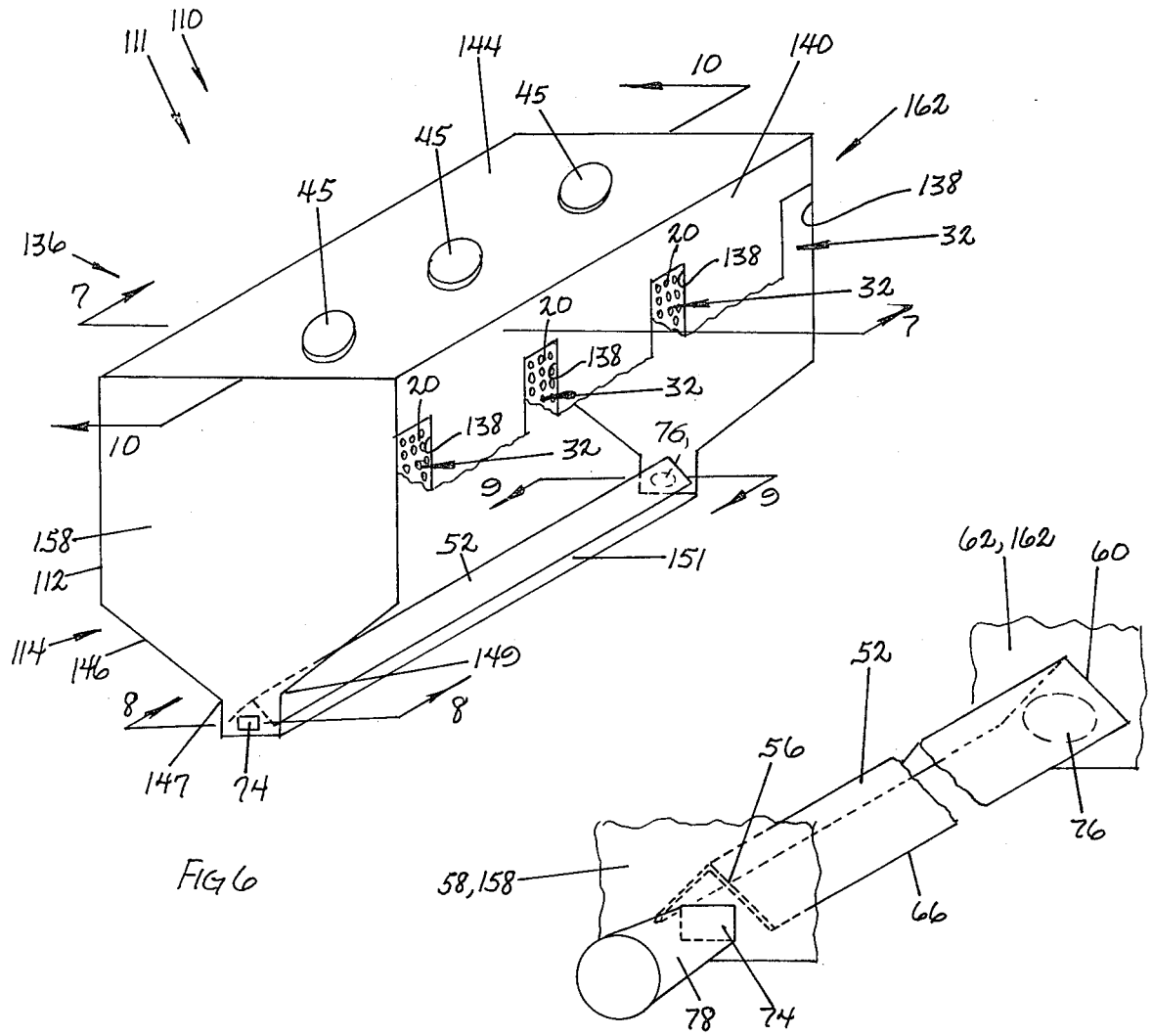
FIG 6
FIG 11
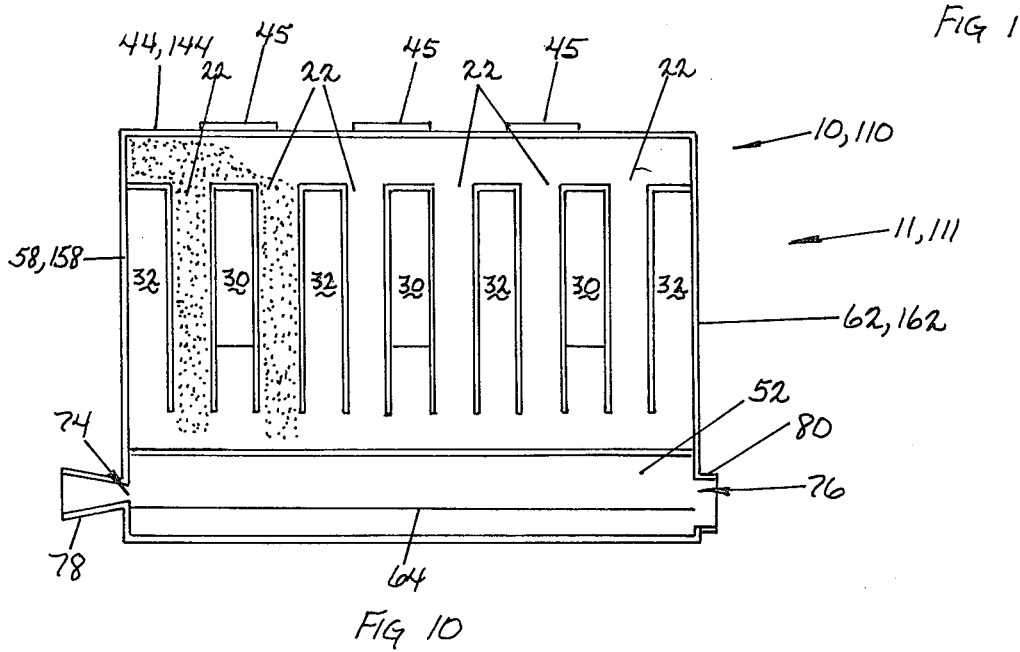
FIG 10

DISCHARGE APPARATUS FOR REMOVING GRANULAR FILTER MATERIAL FROM A FILTER HOUSING AND A FILTER APPARATUS HAVING SAME

This application is a continuation of U.S. patent application Ser. No. 808,915, filed June 22, 1977, now abandoned.

BACKGROUND OF THE INVENTION

The present invention pertains to gas separation, and more particularly to gas separation devices using a solid sorbent for a vaporous or gaseous constituent.

In gas separation devices, particularly those used in the nuclear field to remove radioactive constituents from a gas stream, it is necessary to, from time to time, remove the radioactive solid sorbent material from the gas separation device prior to recharging the gas separation device with fresh uncontaminated solid sorbent material. It is not only important that all of the radioactive solid sorbent material be removed, but also that it be removed without contaminating the ambient atmosphere, or equipment and personnel which may be nearby. An additional consideration is that the contaminated radioactive sorbent material be rapidly removed in order to reduce expensive down time of the gas separator device.

SUMMARY OF THE INVENTION

The present invention recognizes these requirements and provides a discharge apparatus for removing a granular solid sorbent gas treating material from the interior of a filter housing which fulfills these requirements and further which is straightforward, and inexpensive to make and maintain in service.

More particularly, the present invention provides a discharge apparatus for removing a granular solid sorbent gas treating material from the interior of a filter housing, the discharge apparatus comprising:

a discharge apparatus for removing a granular gas treating material from the interior of a filter housing, the discharge apparatus comprising:

means defining a gas treating material conveying channel disposed within and extending across the filter housing proximate the bottom thereof, the interior of the channel being open to the interior of the housing along the longitudinal sides of the channel defining means;

means defining a conveying gas inlet aperture through one wall of the filter housing into the interior of the channel defining means at one end of the channel defining means; and, means defining a gas treating material and conveying gas outlet aperture from the interior of the channel defining means through the filter housing wall at the other end of the channel defining means, the outlet aperture being larger in area than the inlet aperture.

In addition, the present invention provides a filter apparatus comprising:

(a) a filter housing comprising:

(1) a gas treating enclosure portion having at least one dirty gas inlet aperture formed in one of its walls and at least one clean gas outlet aperture formed in at least one of its walls;

(2) a hopper portion disposed below and open to the gas treating portion having at least two facing walls sloping downwardly toward and intersecting each other, thus, defining a V-shaped configuration in cross-section, the V-shaped hopper being symmetrically disposed beneath and open to the gas treating enclosure portion;

(b) means defining a plurality of filter cells to be filled with a granulated gas treating material, disposed within the gas treating enclosure portion of the filter housing, and the filter cell defining means being open to the hopper portion of the filter housing so that when the filter cell defining means are filled with granulated gas treating material, granulated gas treating material will fall into the hopper portion of the filter housing;

(c) means cooperating with the sloping walls of the hopper portion to define a gas treating material conveying channel within and extending across the hopper portion of the filter housing proximate the bottom thereof, the interior of the channel being open to the interior of the hopper portion of the housing only along the longitudinal sides of the channel defining means;

(d) means defining a conveying gas inlet aperture through one wall of the hopper portion of the filter housing into the interior of the channel defining means at one end of the channel defining means; and, (e) means defining a gas treating material and conveying gas outlet aperture from the interior of the channel defining means through the wall of the hopper portion of the filter housing at the other end of the channel defining means, the outlet aperture being larger in area than the inlet aperture.

BRIEF DESCRIPTION OF THE DRAWINGS

The description herein makes reference to the accompanying drawings wherein like numerals refer to like parts throughout, and in which:

FIG. 6 is an isometric partially broken away view of another filter device incorporating the present invention;

FIG. 10 is a longitudinal cross-sectional view taken in the direction of arrows 10—10 in FIG. 1 and arrows 10—10 in FIG. 6;

FIG. 11 is an enlarged isometric fragmented view of the present invention; and,

DETAILED DESCRIPTION

Figure 1:
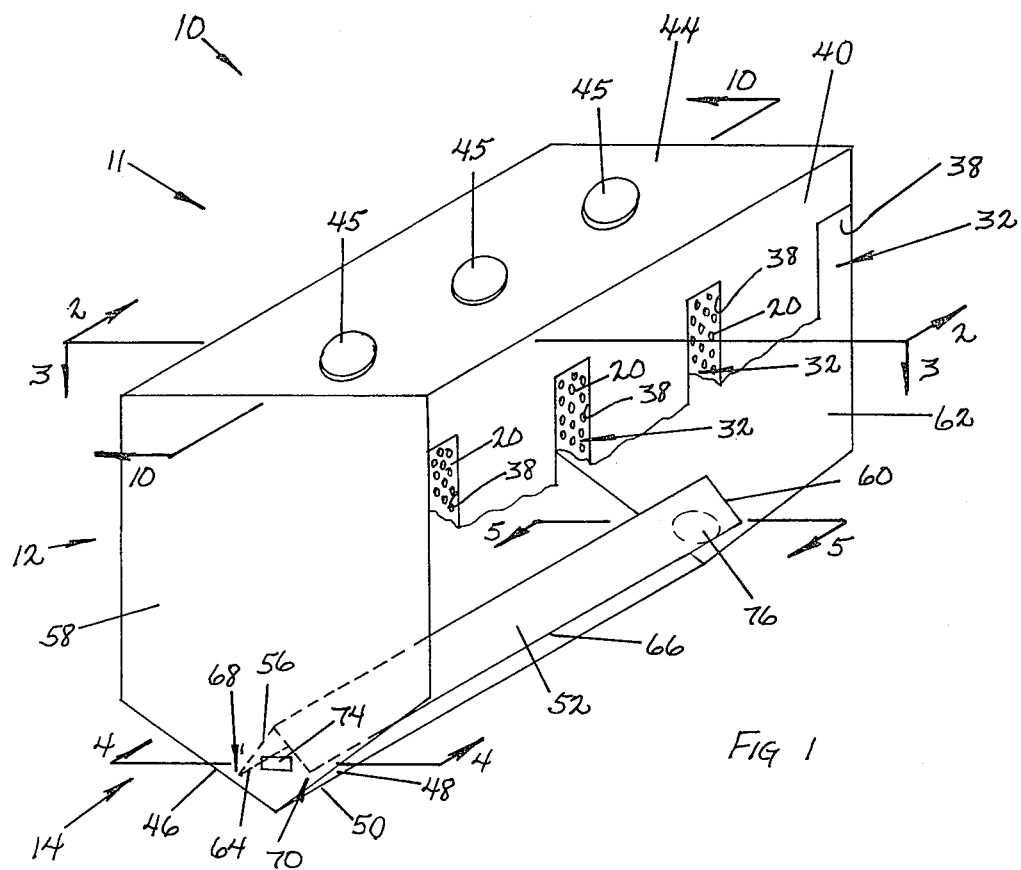
FIG. 1 is an isometric, partially broken away view of a filter device incorporating the present invention.

FIG. 1 shows a rechargeable gas filter apparatus 10 which is particularly suitable for use in the nuclear field for removing radioactive constituents from a gas stream. The filter apparatus 10 comprises a housing 11 with an upper gas treating enclosure portion 12 and a lower hopper portion 14 open to the gas treating enclosure portion 12.

A plurality of spaced apart filter cells 16 are disposed within the upper gas treating enclosure portion 12. Each filter cell 16 comprises spaced apart parallel planar foraminous front and back walls 18 and 20, respectively, an open top face 22, closed end surfaces 24 and 26, and an open bottom face 28. The filter cells 16 are vertically disposed within the gas treating enclosure portion 12 with the foraminous front and back walls 18, 20 of each filter cell being spaced from and parallel to adjacently disposed filter cells and the open bottom faces 28 of each filter cell facing toward and open to the hopper portion 14 of the filter apparatus 10. A plurality of alternating dirty gas inlet passageways 30 and clean gas outlet passageways 32 are defined between the spaced apart filter cells 16.

The gas treating enclosure portion 12 of the gas filter apparatus 10 further comprises a plurality of dirty gas inlet apertures 34 formed in its upstream wall 36, each dirty gas inlet aperture 34 communicating with a different one of the dirty gas inlet passageways 30. Likewise, a plurality of clean gas outlet apertures 38 are formed in the downstream wall 40 of the gas treating enclosure portion 12, each clean gas outlet aperture 38 communicating with a different one of the clean gas outlet passageways 32.

Means for charging the filter cells 16 with uncontaminated solid sorbent gas treating material, such as a granulated charcoal or activated carbon, may be situated in the gas treating enclosure portion 12 of the filter apparatus 10. Such a charging means is illustrated, for exemplary purposes, in the figures as a plurality of openings 42 in the top wall 44 of the gas treating enclosure portion 12. Each opening 42 can be closed by a cover 45 secured in place by virtually any one of a number of conventional means. Any one of a number of solid sorbent charging means can be used. However, because the charging means does not comprise any part of the present invention, it will not be further discussed herein.

Figure 2:
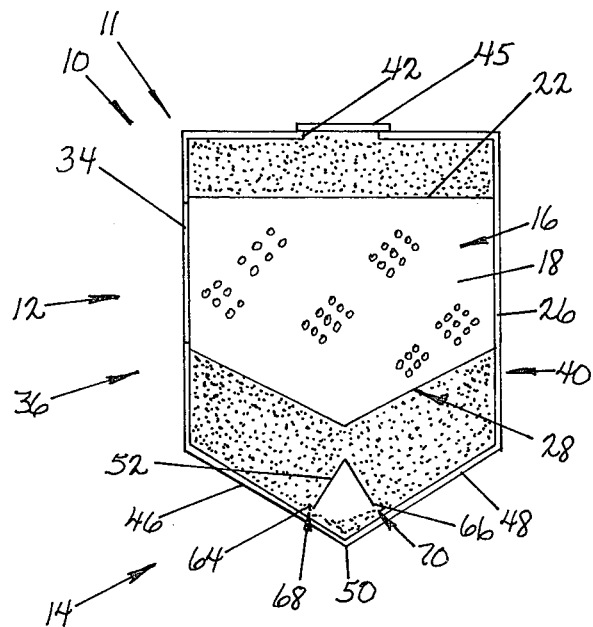
FIG. 2 is a transverse cross-sectional view taken in the direction of arrows 2—2 in FIG. 1.
Figure 3:
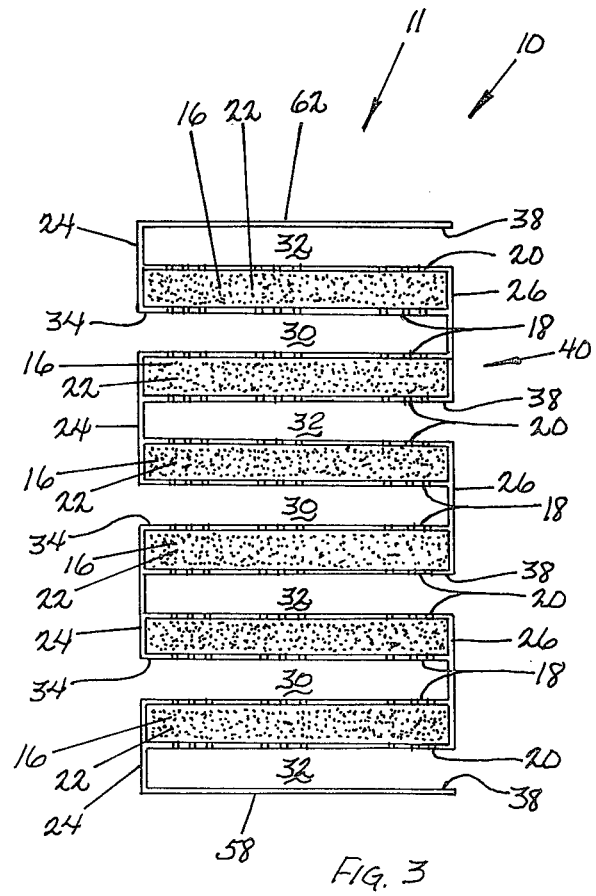
FIG. 3 is a horizontal cross-sectional view taken in the direction of arrows 3—3 in FIG. 1.

With continued reference to FIGS. 1 and 2, the hopper portion 14 of the filter apparatus 10 has at least two of its facing walls 46 and 48 sloping downwardly toward each other and intersecting each other at their depending edges, generally denoted at the numeral 50, thus, defining a V-shaped configuration in transverse cross-section. The V-shaped hopper portion 14 is symmetrically disposed relative to the gas treating enclosure portion 12. Preferably, the sloping wall 46 is the wall of the hopper portion 14 which is adjacent the upstream wall 36 of the gas treating enclosure portion 12 and the sloping wall 48 is the wall of the hopper portion 14 which is adjacent the downstream wall 40 of the gas treating enclosure portion 12 so that the intersection of the sloping walls 46, 48 is oriented transverse to the planar foraminous front and back walls 18 and 20 of the filter cells 16.

Referring now to FIGS. 1 and 2, means such as an elongated baffle plate 52 is disposed within the hopper portion 14 and cooperates with the sloping walls 46, 48 of the hopper portion 10 to define a gas treating material conveying channel. The elongated baffle plate 52 is spaced above the intersection 50 of the sloping walls 46, 48 of the hopper portion 14. The baffle plate 52 preferably has a chevron shape in transverse cross-section with the apex of the chevron in line with and projecting upwardly away from the intersection 50 of the sloping walls 46, 48. The included angle of the chevron shaped baffle is advantageously approximately 90°. The baffle plate 52 extends completely across the hopper portion 14 and is attached at one of its ends 56 to one side wall 58 of the housing 11 and at its other end 60 to the opposite side wall 62 of the housing 11. The baffle plate 52 comprises two generally parallel longitudinal edges 64 and 66. The longitudinal edge 64 of the baffle plate 52 is spaced from the sloping wall 46 adjacent to it. Thus, two mutually parallel elongated slots 68 and 70 are defined, slot 68 between the longitudinal baffle edge 64 and the sloping hopper wall 46, and slot 70 between the longitudinal baffle edge 66 and sloping hopper wall 48. These elongated slots 68 and 70 are also parallel to the intersection 50 of the sloping hopper walls 46 and 48. The interior 72 of the gas treating material conveying channel is thus open to or communicates with the interior of the hopper portion 14 only through the elongated slots 68 and 70.

Figure 4:
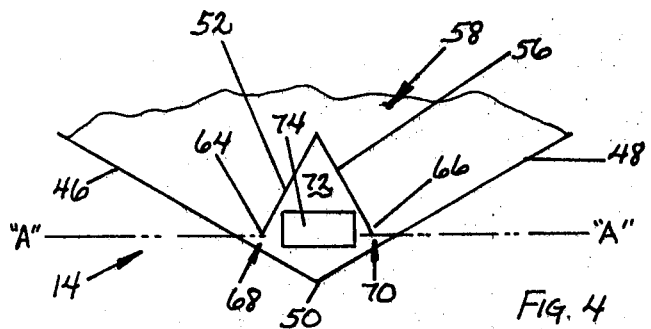
FIG. 4 is an enlarged segmented end view taken in the direction of arrows 4—4 in FIG. 1.
Figure 5:
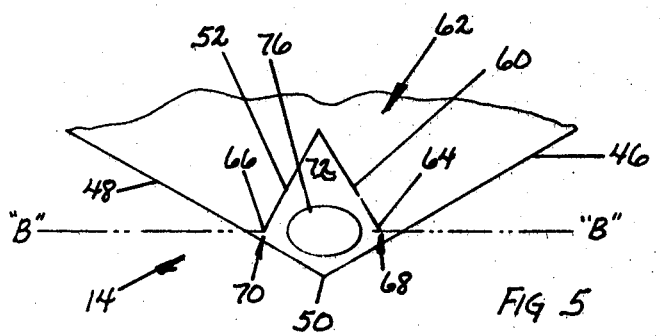
FIG. 5 is an enlarged segmented end view taken in the direction of arrows 5—5 in FIG. 1.

Now with reference to FIGS. 1, 4 and 5, a conveying gas inlet aperture 74 is formed through the filter housing side wall and opens into the interior 72 of the channel at one of the ends of the channel. Similarly, a gas treating material and conveying gas outlet aperture 76 is formed through the opposite filter housing side wall 62 and opens into the interior 72 of the channel at the other end of the channel from the inlet aperture 74.

The gas treating material and conveying gas outlet aperture 76 is larger in area than the conveying gas inlet aperture 74 so that a greater negative pressure is created in the channel interior 72 proximate the conveying gas inlet 74 than at the other end of the channel interior 72 proximate the gas treating material and conveying gas outlet 76. The conveying gas inlet aperture 74 is advantageously rectangular in peripheral shape, while the gas outlet aperture 76 is oval in peripheral shape; however, other shapes, may be used. Preferably, the conveying gas inlet 74 is located so that at least 50% of its area is in that region, at the end of the channel, which is bounded by an imaginary transverse line A—A (see FIG. 4) intersecting both the longitudinal edges 64, 66 of the chevron shaped baffle plate 52, the sloping surfaces of the chevron shaped baffle plate and the apex of the chevron shaped baffle plate 52. Likewise, the gas treating material and conveying gas outlet aperture 76 is located so that at least 50% of its area in that region, at the other end of the channel, which is bounded by an imaginary transverse lline B—B (see FIG. 5) intersecting both longitudinal edges 64, 66 of the chevron shaped baffle plate 52, the sloping surfaces of the chevron shaped baffle plate 52, and the apex of the chevron shaped baffle plate 52. It is also preferable that the intersection 50 of the sloping hopper walls 46 and 48 is as near to being tangential to the outlet aperture 76 as possible.

Now with reference to FIGS. 10 and 11, the conveying gas inlet aperture 74 comprises a converging nozzle 78, the aperture 74 being the outlet opening of the nozzle 78. The convergent nozzle 78 is fitted through an appropriate opening in the housing side wall 58 and is secured to the side wall 58, for example, by welding.

As can be seen in FIG. 10, a collar 80 can be fitted around the periphery of the gas treating and conveying outlet aperture 76 so that a pneumatic hose may be connected thereto.

Figure 7:
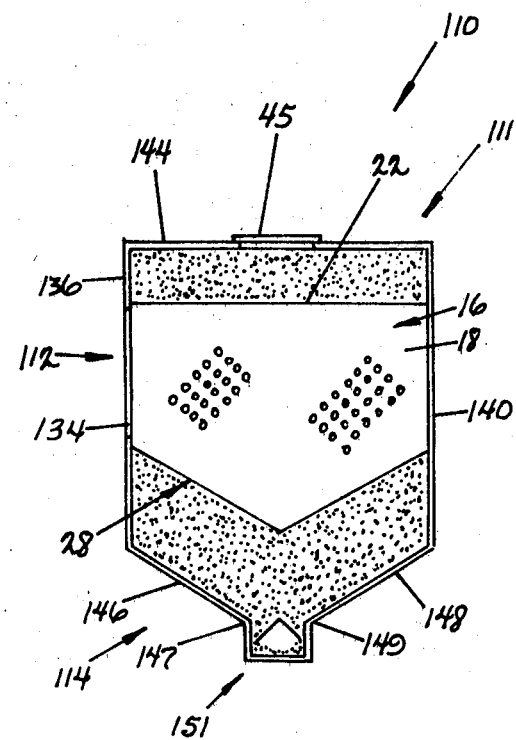
FIG. 7 is a transverse cross-sectional view taken in the direction of arrows 7—7 in FIG. 6.

FIGS. 6 and 7 illustrate another advantageous filter apparatus 110 which is also particularly suitable for use in the nuclear field for removing radioactive constituents from a gas stream. The filter apparatus 110 comprises a housing 111 with an upper gas treating enclosure portion 112 and a lower hopper portion 114 open to the gas treating enclosure portion 112.

A plurality of the filter cells 16 are disposed within the upper gas treating enclosure portion 112 in the same manner as they are in the filter housing 11 previously described, and likewise define the plurality of alternating dirty gas inlet passageways 30 and clean gas outlet passageways 32 therebetween.

The gas treating enclosure portion 112 of the filter apparatus 110 further comprises a plurality of dirty gas inlet apertures 134 formed in its upstream wall 136, each dirty gas inlet aperture 134 communicating with a different one of the dirty gas inlet passageways 30. Similarly, a plurality of clean gas outlet apertures 138 are formed in the downstream wall 140 of the gas treating enclosure portion 112, each clean gas outlet aperture 138 communicating with a different one of the clean gas outlet passageways 32.

As with filter apparatus 10, the filter apparatus 110 also includes means for charging or filling the filter cells 16 with fresh or uncontaminated solid sorbent material. The charging means is illustrated for exemplary purposes as the plurality of openings 42 in the top wall 144 of the gas treating portion 112. Each opening 42 can be closed by a cover 45. Because the charging means does not comprise a part of the present invention, and because any one of a number of solid sorbent charging means may be used, it will not be further discussed.

With continued reference to FIGS. 6 and 7, the hopper portion 114 of the filter apparatus 110 has at least two of its facing walls 146 and 148 sloping downwardly toward each other from their points of attachment to the upstream wall 136 and downstream wall 140, respectively, of the gas treating enclosure portion 112. The sloping walls 146 and 148 each terminate at distal ends 147 and 149, respectively. Elongated trough means 151 having a generally rectangular shape in transverse cross-section is disposed between and connected to, or integrally formed with, the distal ends 147 and 149 of the sloping walls 146 and 148. Elongated trough means 151 is open to the interior of the hopper portion 114 and extends completely across the hopper portion from one side wall 158 of the filter housing 111 to the other side wall 162 of the filter housing 111 with the longitudinal axis of the elongated trough 151 being transverse to the planar foraminous surfaces 18 and 20 of the filter cells 16 disposed in the upper gas treating enclosure portion 112.

Still referring to FIGS. 6 and 7, means, such as the elongated baffle plate 52 is disposed within the trough 151 and cooperates with the walls of the trough 151 to define a gas treating material conveying channel. The elongated baffle plate 52 preferably has a chevron shape in transverse cross-section with the apex of the chevron projecting upwardly out of the trough 151 and toward the filter cells 16 located above it in the gas treating enclosure portion 112. The baffle 52 extends completely across the hopper portion 114, and therefore the full length of the trough 151, and is attached at one of its ends 56 to one side wall 158 of the housing 111 and at the other of its ends 60 to the opposite side wall 162 of the housing 111. The longitudinal edge 64 of the baffle plate 52 is spaced from the wall of the trough 151 adjacent to it, and the other longitudinal edge 66 of the elongated baffle plate 52 is spaced from the walls of the trough 151 adjacent to it. Thus, the two mutually parallel elongated slots 68 and 70 are defined, slot 68 between the longitudinal baffle edge 64 and the wall of the trough 151 adjacent thereto, and slot 70 between the longitudinal baffle edge 66 and the wall of the trough 151 adjacent thereto. The interior 72 of the gas treating material conveying channel is thus open to, or communicates with, the interior of the hopper portion 112 only through the elongated slots 68 and 70.

Figure 8:
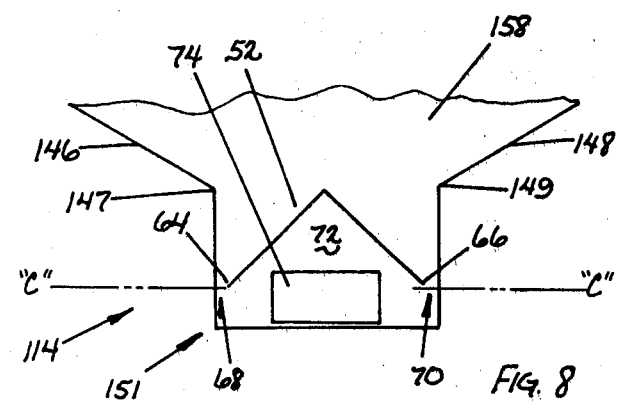
FIG. 8 is an enlarged segmented end view taken in the direction of arrows 8—8 in FIG. 6.
Figure 9:
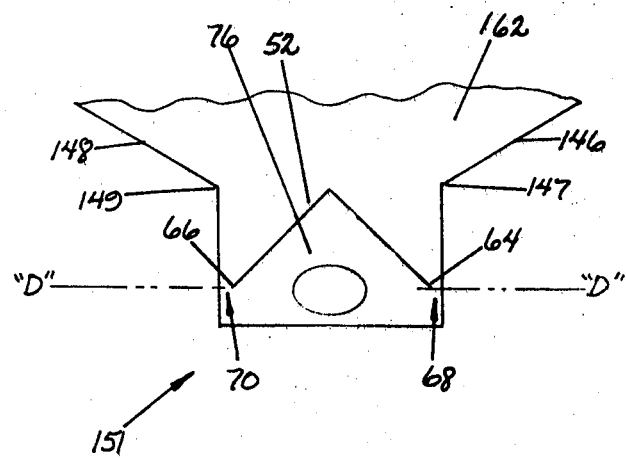
FIG. 9 is an enlarged segmented end view taken in the direction of arrows 9—9 in FIG. 6.

Now referring to FIGS. 6, 8 and 9, a conveying gas inlet aperture 74 is formed through the filter housing side wall 158 and opens into the interior 72 of the channel at one of the ends of the channel. Similarly, a gas treating material and conveying gas outlet 76 is formed through the opposite filter housing side wall 162 and opens into the interior 72 of the channel from the inlet aperture 74. The gas treating material and conveying outlet aperture 76 is larger in area than the conveying gas inlet aperture 74 so that a greater negative pressure is created in the channel interior 72 proximate the conveying gas inlet aperture 74 than at the other end of the channel interior 72 proximate the gas treating material and conveying gas outlet aperture 76. The conveying gas inlet aperture 74 is advantageously rectangular in peripheral shape and the outlet aperture 76 is oval in peripheral shape; however, other shapes may be used. Preferably, the conveying gas inlet aperture 74 is located so that at least 50% of its area is in that region, at the end of the channel, which is bounded by an imaginary transverse line C—C (see FIG. 8) intersecting the longitudinal edges 64 and 66 of the chevron shaped baffle plate 52, the sloping surfaces of the chevron shaped baffle plate 52, and the apex of the chevron shaped baffle plate. Likewise, the gas treating material and conveying gas outlet aperture 76 is located so that at least 50% of its area is that region, at the other end of the channel, which is bounded by an imaginary transverse line D—D (see FIG. 9) intersecting both longitudinal edges 64, 66 of the chevron shaped baffle plate 52, the sloping surfaces of the chevron shaped baffle plate 52, and the apex of the chevron shaped baffle plate 52. It is also preferable that the bottom wall of the trough 151 is as near to being tangential to the outlet aperture 76 as possible.

With reference again to FIGS. 10 and 11, as with the filter apparatus 10, the conveying gas inlet aperture 74 of the filter apparatus 110 comprises the converging nozzle 78, the inlet aperture 74 being the outlet opening of the nozzle 78. The convergent nozzle 78 is fitted through an appropriate opening in the housing side wall 158 and is secured to the side wall 158, for example, by welding.

As can be seen in FIG. 10, a collar 80 can be fitted around the periphery of the gas treating material and conveying gas outlet aperture 76 so that a pneumatic hose may be connected thereto.

Figure 12:
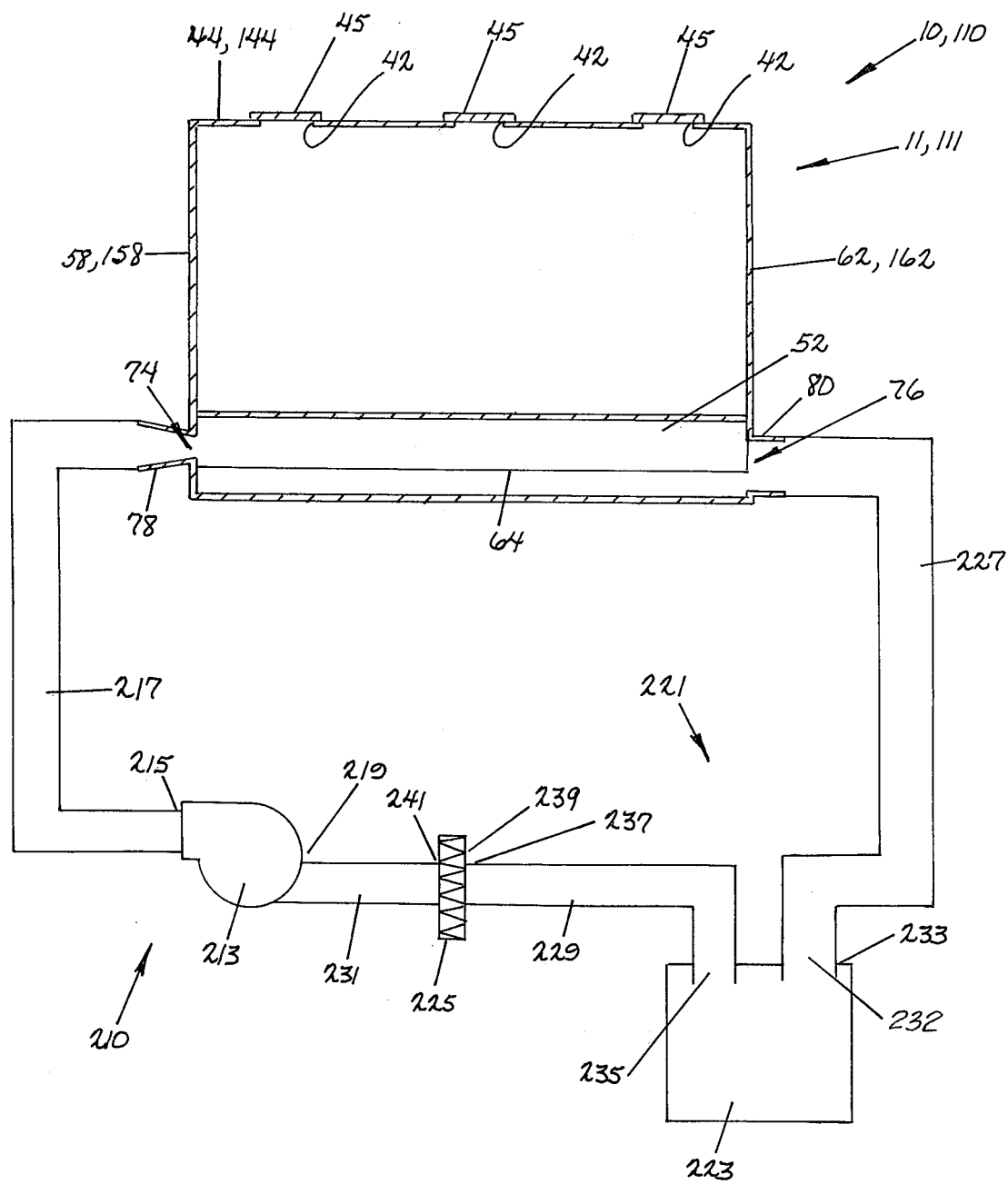
FIG. 12 is a schematic sketch of a filter housing incorporating the present invention operatively connected to a pneumatic conveying system.

Referring now to FIG. 12, there is shown a closed loop pneumatic gas treating material removing system, generally denoted as the numeral 210, which comprises either the gas filter apparatus 10 or 110. The closed loop pneumatic gas treating material removing system 210 also comprises a blower 213 having its outlet or pressure side 215 operatively connected to the conveying gas inlet aperture 74 into the interior 72 of the gas treating material conveying channel of the filter apparatus 10, 110 by means of, for example, a conveying gas conduit 217. The inlet or suction side 219 to the blower 213 is operatively connected to the gas treating material and conveying gas outlet 76 from the interior 72 of the gas treating material conveying channel of the filter apparatus 10, 110 by means of, for example, a conveying gas conduit 221. Interposed between the blower inlet 219, and the gas treating material and conveying gas outlet 76 in the conveying gas conduit 221 is a gas treating material separator and reservoir device 223 for separating the contaminated gas treating material, and at least one high efficiency gas filter device 225.

The conveying gas conduit 221 is comprised of three sections: 227, 229 and 231. The first section 227 connects the gas treating material and conveying gas outlet aperture 76 with the separator and reservoir device 223. The end 232 of the conduit section 227 which is connected to the separator and reservoir device 223 projects downwardly through the top 233 of the separator and reservoir device 223 a short distance into its interior. The second conduit section 229 interconnects the separator and reservoir device 223 with the gas filter device 225. The end 235 of the conduit section 229 connected to the separator and reservoir device 223 also projects downwardly through the top 233 a short distance into its interior. The other end 237 of the second conduit section 229 terminates at the upstream side 239 of the gas filter device 225. The third conduit section 231 interconnects the downstream side 241 of the filter device 225 and the low pressure inlet 219 of the blower 213.

In operation, in order to evacuate or remove contaminated solid sorbent gas treating material (indicated by the mottling in the various figures) from the filter housing 11, 111 the blower 213 is actuated to provide a flow of high pressure conveying gas, in this instance, air. This flow of high pressure air is conveyed through the conveying gas inlet aperture 74 and into the interior 72 of the gas treating material conveying channel. As the conveying gas stream passes through the conveying nozzle 78 and into the interior 72 of the channel, it is accelerated. As the conveying gas stream flows along the interior of the channel to the gas treating material and conveying gas outlet aperture 76 it causes the solid sorbent gas treating material in the hopper section 14, 114 to be aspirated through the longitudinal slots 68, 70 into the interior 72 of the conveying channel first at the end of the channel proximate the inlet aperture 74, and then progressing along the entire length of the channel. The accelerated conveying gas stream in the channel interior proximate the conveying gas inlet aperture 74 causes a part of the static gas pressure at this point to be converted into velocity pressure thereby increasing the negative static pressure. Therefore, there is a greater negative static pressure in the channel interior 72 proximate the inlet aperture 74 than there is toward the other end of the channel interior 72 proximate the outlet aperture 76 and this causes the hopper to be emptied from the end proximate the inlet aperture 74 first. If the negative static pressure in the channel interior 72 was constant along its length, or if the negative static pressure in the channel interior proximate the outlet aperture 76 was greater than the negative static pressure proximate the inlet aperture 74, solid sorbent gas treating material would aspirate into the channel interior 72 first proximate the outlet aperture 76 but would not progressively aspirate into the channel interior 72 along the longitudinal slots 68, 70 toward the inlet aperture 74 and the blower 213 would merely suck air instead. The gas treating material within the channel interior 72 is carried by the conveying gas stream out of the channel interior 72 through the gas treating material and conveying gas outlet aperture 76 due to the suction in the conveying gas conduit 221 due to the fact that the conveying gas conduit 221 is interconnected to the suction side of the blower 213. The conveying gas borne gas treating material passes through the first conduit section 227 to the gas material separator and reservoir device 223. The gas borne gas treating material exits the first conduit section 227 through its downwardly projecting open end 231 into the interior of the separator and reservoir 223. Because the open end 235 of the second conduit section 229 is covered with a particulate matter separating material (not shown) essentially all of the solid sorbent gas treating material is separated out of the conveying gas stream. The conveying gas stream, now relatively free of solid sorbent gas treating material, passes through the second conduit section 229 to the upstream side 239 of the gas filter device 225, and through the gas filter device 225 from its upstream side 239 to its downstream side 241 wherein any residual gas treating material is separated from the conveying gas stream. Upon leaving the downstream side 241 of the filter device 225 the conveying gas enters the third conduit section 231 and passes there along to the inlet or suction side 219 of the blower 213 wherefrom it is recirculated through the pneumatic conveying system 210.

When the gas treating material separator and reservoir 223 become full of separated gas treating material, the blower 213 is temporarily deactivated. The top 233 is removed from the separator reservoir 223 which is then removed from the pneumatic conveying system 210 and disposed of. An empty separator and reservoir device 223 is put in place of the removed full one and the top 233 is put in place over the empty separator and reservoir device 223. The blower is reactivated and the above described process is continued.

The foregoing detailed description is given primarily for clearness of understanding and no unnecessary limitations should be understood therefrom for modifications will be obvious to those skilled in the art upon reading this disclosure any may be made without departing from the spirit of the invention or the scope of the appended claims.

What is claimed is:
1. A filter apparatus comprising:
(a) a filter housing having opposing upstream and downstream walls andd a pair of opposing side walls interconnecting the upstream and downstream walls including:
(1) a gas treating enclosure having a plurality of dirty gas inlet apertures in the upstream wall and a plurality of clean gas outlet apertures in the downstream wall;
(2) a hopper portion disposed below and open to the interior of the gas treating enclosure having a pair of downwardly converging sloping walls extending from the opposing upstream and downstream walls between the side walls; and,
(3) elongated trough means extending completely across the hopper portion and being open to the interior of the hopper portion along its entire length;
(b) means defining a plurality of filter cells adapted to be filled with a granulated gas treating material disposed within the gas treating enclosure of the filter housing such that gas to be cleaned passes through one of said filter cells before exiting through one of said clean gas outlet apertures, said filter cell defining means being open to the hopper portion of the filter housing so that when the filter cell defining means are filled with granulated gas treating material, granulated gas treating material will fall into the hopper portion of the filter housing;

(c) an elongated baffle plate secured to the side walls spaced above the bottom of the elongated trough means and extending completely across the hopper portion and cooperating with the elongated trough means to define an elongated gas treating material conveying channel within and extending completely across the hopper portion of the filter housing, the longitudinal edges of the elongated baffle plate being spaced from the sides of the elongated trough means to define two parallel elongated slots between the longitudinal edges of the elongated baffle plate and the sides of the elongated trough means which are of uniform width and extend parallel to the longitudinal axis of the elongated trough means so that the gas treating material conveying channel is open to the interior of the hopper portion of the filter housing only along the longitudinal edges of the elongated baffle plate;

(d) a conveying gas inlet aperture in one of the side walls opening into the gas treating material conveying channel at one end of the gas treating material conveying channel;

(e) a gas treating material and conveying gas outlet aperture in the other side wall opening into the other end of the gas treating material conveying channel, said gas treating material and conveying gas outlet aperture being larger in cross-sectional area than said conveying gas inlet aperture to promote progressive aspiration of treating material from the interior of the hopper portion along the conveying channel commencing at the end of the channel proximate the conveying gas inlet aperture.

2. The filter apparatus of claim 1 wherein the elongated baffle plate is of chevron shape in transverse cross-section with the apex of the chevron projecting upwardly.

3. The filter apparatus of claim 2 wherein:
the elongated trough means is transversely centrally disposed within the hopper portion of the filter housing; and,
the elongated baffle plate is transversely centrally disposed within the hopper portion of the filter housing.

4. The filter apparatus of claim 2 wherein the included angle of the chevron shaped baffle plate is approximately 90°.

5. The filter apparatus of claim 2 wherein:
the conveying gas inlet aperture is generally rectangular in shape; and,
the gas treating material and conveying gas outlet aperture is generally oval in shape.

6. The filter apparatus of claim 2, wherein:
the gas conveying inlet aperture is formed in its respective side wall so that at least 50% of its area is located in that region at one end of the channel which is bounded by an imaginary transverse line joining the longitudinal edges of the chevron shaped elongated baffle plate, the sloping surfaces of the chevron shaped elongated baffle plate, and the apex of the chevron shaped elongated baffle plate; and
the gas treating material and conveying gas outlet aperture is formed in its respective side wall so that at least 50% of its area is located in that region at the other end of the channel which is bounded by an imaginary transverse line joining the longitudinal edges of the chevron shaped elongated baffle plate, and the apex of the chevron shaped elongated baffle plate.

7. The filter apparatus of claim 1 wherein:
a converging nozzle forming said conveying gas inlet aperture is secured to the side wall having said aperture.

8. The filter apparatus of claim 1 further comprising:
a suction source located outside of the filter housing;
a source of pressurized conveying gas located outside of the filter housing;
the suction source being in communication with the interior of the gas treating material conveying channel through the gas treating material conveying gas outlet aperture; and,
the source of pressurized conveying gas being in communication with the gas treating material conveying channel through the conveying gas inlet aperture.

9. The filter apparatus of claim 8 wherein:
the suction source is on the low pressure side of a blower and,
the source of pressurized conveying gas is the pressure side of the same blower.

* * * * *